US012497099B2

(12) United States Patent
Onozuka

(10) Patent No.: US 12,497,099 B2
(45) Date of Patent: Dec. 16, 2025

(54) STEERING SYSTEM

(71) Applicant: TOYOTA JIDOSHA KABUSHIKI KAISHA, Toyota (JP)

(72) Inventor: Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 18/785,337

(22) Filed: Jul. 26, 2024

(65) Prior Publication Data

US 2025/0115293 A1    Apr. 10, 2025

(30) Foreign Application Priority Data

Oct. 10, 2023  (JP) ................................. 2023-175320

(51) Int. Cl.
*B62D 6/00* (2006.01)
*B62D 9/00* (2006.01)

(52) U.S. Cl.
CPC ............... *B62D 6/002* (2013.01); *B62D 9/00* (2013.01)

(58) Field of Classification Search
CPC ........... B62D 6/002; B62D 9/00; B62D 7/159
See application file for complete search history.

(56) References Cited

U.S. PATENT DOCUMENTS

| 6,157,892 A * | 12/2000 | Hada | B60T 8/17558 340/436 |
| 11,505,184 B2 * | 11/2022 | Park | B62D 15/021 |
| 2019/0002020 A1 * | 1/2019 | Yoo | G01L 5/221 |

FOREIGN PATENT DOCUMENTS

JP    2005-239078 A    9/2005

* cited by examiner

*Primary Examiner* — Sizo B Vilakazi
(74) *Attorney, Agent, or Firm* — Sughrue Mion, PLLC

(57) ABSTRACT

A steering system for a vehicle includes: a front wheel steering device configured to steer a front wheel, a rear wheel steering device configured to steer a rear wheel, and a controller configured to control the front wheel steering device and the rear wheel steering device such that the front wheel and the rear wheel are steerable independently of each other. When the front wheel passes unevenness, the controller executes a rear wheel avoidance control to avoid the rear wheel from passing the unevenness. In the rear wheel avoidance control, the controller determines a rear-wheel avoidance side slip angle, which is a vehicle center-of-gravity point side slip angle to be realized, and determines a target steering angle, which is a steering angle to which each of the front wheel and the rear wheel is to be steered, based on the rear-wheel avoidance side slip angle.

6 Claims, 5 Drawing Sheets

STEERING SYSTEM

REFERENCE TO RELATED APPLICATIONS

This application claims priority from Japanese Patent Application No. 2023-175320 filed on Oct. 10, 2023. The entire content of the priority application is incorporated herein by reference.

TECHNICAL FIELD

The following disclosure relates to a steering system for a vehicle.

BACKGROUND ART

A technology described in Japanese Patent Application Publication No. 2005-239078 (JP 2005-239078A), that is, a technology for preventing rollover of a vehicle by detecting a lift of a wheel during traveling of the vehicle and warning a driver or braking the vehicle has been studied.

SUMMARY

In the technology described in the patent document described above, for example, when a front wheel passes unevenness of a road surface, a rear wheel cannot be prevented from passing the unevenness, and it is difficult to say that the stability of the vehicle can be always maintained favorably. If a steering system capable of favorably ensuring the traveling stability of the vehicle is realized, the steering system is highly practical. The present disclosure has been made in view of such circumstances, and an object thereof is to provide the steering system with high practicality.

In one aspect of the present disclosure, a steering system for a vehicle includes: a front wheel steering device configured to steer a front wheel, a rear wheel steering device configured to steer a rear wheel, and a controller configured to control the front wheel steering device and the rear wheel steering device such that the front wheel and the rear wheel are steerable independently of each other. When the front wheel passes unevenness, the controller executes a rear wheel avoidance control to avoid the rear wheel from passing the unevenness. In the rear wheel avoidance control, the controller determines a rear-wheel avoidance side slip angle, which is a vehicle center-of-gravity point side slip angle to be realized, and determines a target steering angle, which is a steering angle to which each of the front wheel and the rear wheel is to be steered, based on the rear-wheel avoidance side slip angle.

The "vehicle center-of-gravity point side slip angle" can also be referred to as a vehicle body slip angle, and is an angle formed by: an axis passing through the center of gravity of the vehicle and extending in the longitudinal direction of the vehicle (hereinafter sometimes referred to as the "vehicle longitudinal axis"); and a line extending along the traveling direction of the vehicle (hereinafter sometimes referred to as the "traveling direction line"). In the "rear wheel avoidance control", the vehicle center-of-gravity point side slip angle is set to an appropriate angle so that the rear wheel does not pass the unevenness. This angle is the above-mentioned the "rear-wheel avoidance side slip angle". In the rear wheel avoidance control, the steering angle of the front wheel and the steering angle of the rear wheel are controlled so as to realize the rear-wheel avoidance side slip angle. By the control, it is possible to prevent the rear wheel from passing the unevenness that the front wheel has passed. As a result, the running stability of the vehicle is improved.

Various Forms

In a case where the steering system of the present disclosure (hereinafter, also referred to as the "present steering system") is applied to a front, rear, left, and right four-wheeled vehicle including two left and right front wheels and two left and right rear wheels, the "front wheel steering device" may be a device that steers the two front wheels integrally or may be a device that steers the two front wheels independently of each other, that is, a device including two single-wheel steering devices. Similarly, the "rear wheel steering device" may be a device that steers the two rear wheels integrally or may be a device that steers the two rear wheels independently of each other, that is, a device including two single-wheel steering devices. The "controller" may be a single controller, or may be configured to include, for example, a controller that controls the front wheel steering device, a controller that controls the rear wheel steering device, and a controller that collectively controls them. The present steering system is a system in which both the front wheels and the rear wheels can be steered under the control of the controller, and is suitable for an automatically driven vehicle.

The "unevenness" to be avoided by the rear wheel avoidance control is a generic term for a recess, a dent, a protrusion, a bulge, a projection, a step, and the like of a road surface that disturb traveling of a vehicle when the wheel passes. The unevenness to be targeted by the rear wheel avoidance control can be limited to unevenness that considerably disturbs traveling of the vehicle. Specifically, the rear wheel avoidance control may be applied to unevenness that causes a state in which both the front wheel and the rear wheel do not share the load of the vehicle body when the front wheel passes the unevenness, or in short, unevenness that causes a state in which both the front wheel and the rear wheel are lifted. In the front, rear, left, and right four-wheeled vehicle, the rear wheel avoidance control may be applied to unevenness that causes a state in which both the front wheel and the rear wheel are lifted on either the left side or the right side. That is, the present steering system may be configured such that the controller executes the rear wheel avoidance control on condition that the controller detects a lift of both the front wheel and the rear wheel. A method based on ZMP (zero moment point) may be employed as a method for detecting the lift of the front wheel and the rear wheel. This method will be described later.

In the rear wheel avoidance control, the rear-wheel avoidance side slip angle may be determined based on, for example, a wheelbase of the vehicle and a distance by which the rear wheel is to be shifted from the unevenness in a lateral direction (hereinafter, also referred to as the "rear wheel shift distance") in order to avoid the rear wheel from passing the unevenness. A specific determination method will be described later. Incidentally, in the rear wheel avoidance control, the rear wheel may be shifted to the turning outer side or the turning inner side with respect to the front wheel. Further, the rear wheel may be shifted toward the center of the vehicle or the outer side of the vehicle with respect to the front wheel.

Further, in order to reliably avoid the rear wheel from passing the unevenness, the rear wheel avoidance control may be executed until the vehicle travels a distance corresponding to the wheelbase of the vehicle after the front wheel passes the unevenness. In other words, the rear wheel avoidance control may be ended when the vehicle travels the distance corresponding to the wheelbase of the vehicle. The travel distance of the vehicle may be acquired by estimating the self-position based on odometry information obtained by a sensor that measures a wheel rotation amount, GPS, a camera, or the like.

In the present steering system, a "target line travel control" may be executed in which the front wheel and the rear wheel are steered such that the vehicle travels along a target line which is a travel line along which the vehicle is to travel. The target line travel control allows the vehicle to travel along the appropriate travel line. Then, when the front wheel passes the unevenness while the target line travel control is being executed, the rear wheel avoidance control may be executed while the target line travel control continues to be executed. By executing these two controls in parallel, it is possible to cause the vehicle to travel along the appropriate travel line while avoiding the rear wheel from passing the unevenness.

Specifically, the target line travel control may be executed such that, for example, a target point is set on the target line ahead of the vehicle, and the target steering angle of each of the front wheel and the rear wheel is determined based on (a) a positional relationship between the target point and the vehicle and (b) a "standard side slip angle" that is a predetermined vehicle center-of-gravity point side slip angle. The standard side slip angle characterizes the turning characteristic of the vehicle. For example, when the standard side slip angle is set to 0°, the front wheel and the rear wheel are steered in opposite phases to each other, so that so-called zero beta turning is made possible. Incidentally, if the zero beta turn is realized, it is possible to reduce a response delay and improve the steering performance. The standard side slip angle may be fixedly set, or may be variably set according to a vehicle traveling speed (hereinafter, referred to as a "vehicle speed" where appropriate), a turning radius, and the like.

In order to execute the rear wheel avoidance control while executing the target line travel control described above, for example, the rear-wheel avoidance side slip angle may be adopted instead of the standard side slip angle, and the target steering angle of each of the front wheel and the rear wheel may be determined based on the rear-wheel avoidance side slip angle.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which.

DESCRIPTION

Hereinafter, a steering system according to one embodiment of the present disclosure will be described in detail with reference to the drawings as a mode for carrying out the present disclosure. It is to be understood that the present disclosure is not limited to the following embodiment, but may be embodied with various changes and modifications based on the knowledge of those skilled in the art, such as those described in the foregoing "Various Forms".

[A] Hardware Configuration of Steering System

Figure 1:
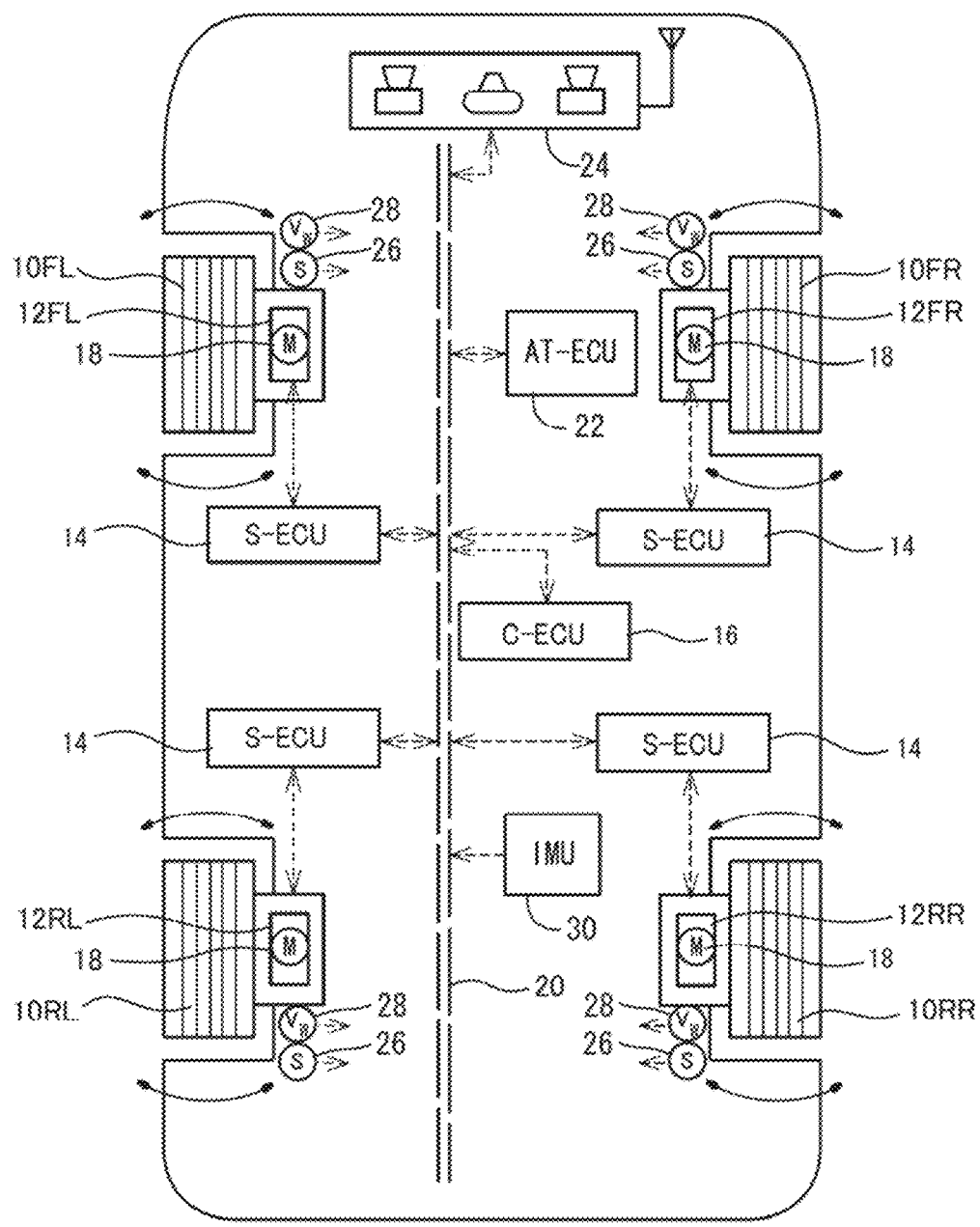
FIG. 1 is a schematic diagram illustrating a hardware configuration of a steering system according to one embodiment.

The steering system of the embodiment (hereinafter, referred to as the "present system" where appropriate) is mounted on a left, right, front, and rear four-wheeled vehicle including a left front wheel 10FL, a right front wheel 10FR, a left rear wheel 10RL, and a right rear wheel 10RR as illustrated in FIG. 1. The present system includes a left front wheel steering device 12FL, a right front wheel steering device 12FR, a left rear wheel steering device 12RL, and a right rear wheel steering device 12RR for independently steering the four wheels 10FL, 10FR, 10RL, and 10RR, in other words, for rotating each of the four wheels 10FL, 10FR, 10RL, and 10RR about the kingpin axis. The present system includes four steering electronic control units (hereinafter sometimes referred to as the "steering ECUs") 14 that respectively control the four wheel steering devices 12FL, 12FR, 12RL, and 12RR, and a central electronic control unit (hereinafter sometimes referred to as the "central ECU") 16 that performs overall control of the present system. The controller of the present system includes the four steering ECUs 14 and the central ECU 16.

In the following description, when the left and right front wheels 10FL and 10FR do not need to be distinguished from each other, each of them may be collectively referred to as a front wheel 10F, and when the left and right rear wheels 10RL and 10RR do not need to be distinguished from each other, each of them may be collectively referred to as a rear wheel 10R. When the front wheel 10F and the rear wheel 10R do not need to be distinguished from each other, each of them may be collectively referred to as a wheel 10. Similarly, the wheel steering devices may be collectively referred to as the front wheel steering device 12F, the rear wheel steering device 12R, or the wheel steering device 12. Further, the suffixes F, R, FL, FR, RL, and RR may be omitted for the specifications, various parameters, and the like corresponding to each wheel 10 when it is not necessary to distinguish between the left and right and the front and rear. Incidentally, it can be considered that one front wheel steering device is configured by the left front wheel steering device 12FL and the right front wheel steering device 12FR, and one rear wheel steering device is configured by the left rear wheel steering device 12RL and the right rear wheel steering device 12RR.

Since each of the wheel steering devices 12 has a general structure, a description of the structure will be omitted. The wheel steering device 12 has a steering motor 18, which is a DC brushless motor, as a drive source, and steers the wheel 10 by an angle corresponding to an amount of rotation of the steering motor 18.

Each of the steering ECUs 14 includes, as a main component, a computer having a CPU, a ROM, a RAM, and the like, and has an inverter as a drive circuit (driver) of the steering motor 18. The central ECU 16 includes, as a main component, a computer having a CPU, a ROM, a RAM, and the like. Each steering ECU 14 and the central ECU 16 are connected to a CAN (car area network or controllable area network) 20 and can communicate with each other via the CAN 20.

Various devices, apparatuses, and systems are provided in the vehicle, and those related to the present system will be briefly described below. Since the vehicle in which the present system is provided travels by automatic driving, the vehicle includes an automatic traveling electronic control unit (hereinafter, also referred to as the "automatic traveling ECU") 22 that controls traveling by the automatic driving (hereinafter, also referred to as "automatic traveling"). The vehicle is provided with a travel information acquisition device 24 that includes a camera for monitoring the surroundings, LiDAR, a communication device for performing information communication with the outside, a GPS device, and the like, and the travel information acquisition device 24 acquires travel information which is information necessary for automatic traveling. The automatic traveling ECU 22 and the travel information acquisition device 24 are also connected to the CAN 20, and the automatic travel ECU 22 determines a target line, which is a travel line along which the vehicle should travel, a vehicle speed, and the like based on the travel information acquired by the travel information acquisition device 24. The vehicle is provided with sensors for detecting an attitude, a behavior, and the like of the vehicle. Specifically, a stroke sensor 26 that detects a stroke, which is a separation distance between the wheel 10 and the vehicle body in the vertical direction, and a rotational speed sensor 28 that detects a rotational speed of the wheel 10 are provided corresponding to each wheel 10. Further, the vehicle is provided with an IMU (inertial measurement unit) 30 that detects accelerations in the longitudinal, lateral, and vertical axis directions of the vehicle and rotational speeds about the longitudinal, lateral, and vertical axes of the vehicle. The sensors 26 and 28 and the IMU 30 are also connected to the CAN 20.

[B] Control in Steering System

In short, the present system determines a target steering angle δ*, which is a target of a steering angle δ of each wheel 10, and steers each wheel 10 such that the steering angle δ of each wheel 10 becomes equal to the determined target steering angle δ*. Specifically, the present system executes, as a basic control that is constantly executed, a target line travel control for causing the vehicle to travel along a target line L*, which is a travel line L along which the vehicle should travel. Then, when any one of the front wheels 10F passes the unevenness, the present system executes a rear wheel avoidance control for preventing the rear wheel 10R located behind the front wheel 10F from passing the unevenness while executing the target line travel control. Hereinafter, the target line travel control and the rear wheel avoidance control will be described in detail, and then a flow of a target steering angle determining process performed in the controls will be described.

(a) Target Line Travel Control

In the target line travel control, the central ECU 16 executes the target steering angle determining process, which is a process for determining the target steering angle δ* of each wheel 10, and each of the steering ECUs 14 executes a wheel steering process, which is a process for steering each wheel 10 such that the steering angle δ of each wheel 10 becomes equal to the target steering angle δ*. These processes will be described in detail below.

i) Target Steering Angle Determining Process for Traveling Target Line

Figure 2A:
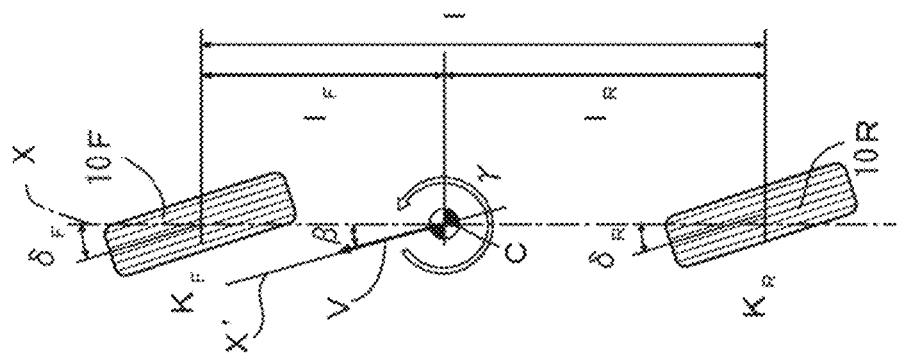
FIG. 2A is a conceptual diagram showing a front and rear two-wheel model relating to steering of wheels.

The central ECU 16 determines a front wheel target steering angle $\delta_F^*$ as a target of a front wheel steering angle $\delta_F$, which is the steering angle δ of the front wheel 10F, and a rear wheel target steering angle $\delta_R^*$ as a target of a rear wheel steering angle $\delta_R$, which is the steering angle δ of the rear wheel 10R, according to a front and rear two-wheel model shown in FIG. 2A. Therefore, in the present system, the left and right front wheels 10FL and 10FR are steered to the same steering angle δ and the left and right rear wheels 10RL and 10RR are steered to the same steering angle δ, although this is for convenience sake.

In the front and rear two-wheel model, the following two equations of motion hold in the steady state.

$$2(K_F + K_R)\beta + \left\{MV + \frac{2}{V}(l_F K_F - l_R K_R)\right\}\gamma = 2K_F \delta_F + 2K_R \delta_R \tag{1}$$

$$2(l_F K_F - l_R K_R)\beta + \frac{2}{V}(l_F^2 K_F + l_R^2 K_R)\gamma = 2l_F K_F \delta_F + 2l_R K_R \delta_R \tag{2}$$

In the front and rear two-wheel model and the above two equations, C is a vehicle center-of-gravity point, l is a wheelbase, $l_F$ and $l_R$ are a distance between the front wheel and the center of gravity of the vehicle and a distance between the rear wheel and the center of gravity of the vehicle, respectively, β is a vehicle center-of-gravity point side slip angle, M is a vehicle weight, V is a vehicle running speed (vehicle speed), γ is a yaw rate, and $K_F$ and $K_R$ are front wheel cornering stiffness and rear wheel cornering stiffness, respectively. In the drawings, X indicates a vehicle longitudinal axis, X' indicates a traveling direction line, and the front wheel 10F and the rear wheel 10R are steered in the same phase. In other words, the steering directions of the front wheel 10F and the rear wheel 10R are the same. In the present system, the front wheel 10F and the rear wheel 10R can also be steered such that the front wheel 10F and the rear wheel 10R are in opposite phases, that is, the steering directions are opposite to each other. In this case, the steering angle $\delta_F$ of the front wheel 10F and the steering angle $\delta_R$ of the rear wheel 10R are mutually different positive and negative values.

Here, a turning curvature κ is defined by the following equation.

$$\kappa = \frac{\gamma}{V} \tag{3}$$

By using the turning curvature κ, the above two equations of motion are expressed as follows.

$$2(K_F + K_R)\beta + \{MV^2 + 2(l_F K_F - l_R K_R)\}\kappa = 2K_F \delta_F + 2K_R \delta_R \tag{4}$$

$$2(l_F K_F - l_R K_R)\beta + 2(l_F^2 K_F + l_R^2 K_R)\kappa = 2l_F K_F \delta_F + 2l_F K_R \delta_F \tag{5}$$

By solving the above two equations of motion, the front wheel steering angle $\delta_F$ and the rear wheel steering angle $\delta_R$ can be determined as follows.

$$\delta_F = \beta + \left(\frac{MV^2}{2K_F}\frac{l_R}{l} + l_F\right)\kappa \tag{6}$$

$$\delta_R = \beta + \left(\frac{MV^2}{2K_R}\frac{l_F}{l} - l_R\right)\kappa \tag{7}$$

Figure 2B:
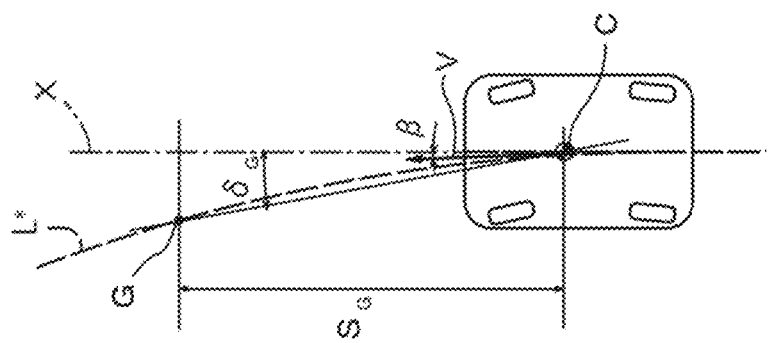
FIG. 2B is a conceptual diagram illustrating a state of traveling on a target line.

On the other hand, in the present system, as shown in FIG. 2B, the target line travel control for causing the vehicle to travel along the target line L*, which is a target of the travel line L, is executed. In other words, a control for causing the vehicle to travel such that the center-of-gravity point C moves on the target travel line is executed. Therefore, a target point G is set on the target line L* ahead of the vehicle. That is, the target point G is set so as to have a specific positional relationship with the vehicle. When a target distance, which is a distance in the vehicle longitudinal direction between the target point G and the vehicle center-of-gravity point C, is $S_G$ and a target point angle, which is an angle formed by: a line connecting the target point G and the vehicle center-of-gravity point C; and a vehicle longitudinal axis X, is $\delta_G$, the turning curvature κ can be expressed by the following equation.

$$\kappa = \frac{2\sin(\delta_G - \beta)}{S_G} \tag{8}$$

In the present system, the target distance $S_G$ is set in accordance with the vehicle speed V. Specifically, the target distance $S_G$ is set to a distance to which the vehicle reaches the target point G in several seconds (for example, 2 seconds). Further, the vehicle center-of-gravity point side slip angle β in the above equation is set to a target side slip angle β*, which is a target of the vehicle center-of-gravity point side slip angle β. The target side slip angle β* determines the turning characteristic of the vehicle. Therefore, the target side slip angle β* may be freely set according to the steering characteristic desired to be realized. In the present system, however, the target side slip angle β* is set to a standard side slip angle $\beta_{REF}$ during turning. Specifically, the standard side slip angle $\beta_{REF}$ may be set to, for example, 0° to achieve a so-called zero beta turn. The standard side slip angle $\beta_{REF}$ may be set so as to change in accordance with the vehicle speed V or the like. The central ECU 16 obtains the turning curvature κ from the above equation by substituting the standard side slip angle $\beta_{REF}$ into the target side slip angle β* during turning, and determines the front wheel target steering angle $\delta_F^*$ and the rear wheel target steering angle $\delta_R^*$, which are targets of the front wheel steering angle $\delta_F$ and the rear wheel steering angle $\delta_R^*$, respectively, from the above two equations based on the turning curvature κ and the target side slip angle β*. Furthermore, in the present system, the target line travel control is executed regardless of whether the vehicle is traveling straight or turning. Therefore, when the vehicle is traveling straight, that is, when the target point angle $\delta_G$ is 0°, the target side slip angle β* is set to 0°.

The front wheel target steering angle δ* and the rear wheel target steering angle $\delta_R^*$ may be determined such that the steering angle δ of the wheels 10 changes in accordance with the vehicle speed V. Specifically, for example, the front wheel target steering angle δ* and the rear wheel target steering angle $\delta_R^*$ may be determined so as to decrease as the vehicle speed V increases and so as to increase as the vehicle speed V decreases. Further, in at least one of the left and right front wheels 10F and the left and right rear wheels 10R, the target steering angles δ* of the left and right wheels 10 may be determined such that the steering angles δ of these wheels 10 are different from each other. For example, the target steering angles δ* of the left and right wheels 10 may be determined such that the steering ratio of the left and right wheels 10 approaches the Ackermann geometry when the vehicle speed V is low and approaches the parallel geometry when the vehicle speed V is high.

ii) Wheel Steering Process

The wheel steering process is a process performed by each of the four steering ECUs 14, and is a process for steering the corresponding wheel 10 such that the steering angle δ of the corresponding wheel 10 becomes equal to the target steering angle δ* sent via the CAN 20. Specifically, the steering ECU 14 identifies a steering angle deviation Δδ (=δ*−δ), which is a deviation of an actual steering angle δ from the target steering angle δ*. The actual steering angle δ is proportional to a motor rotation angle of the steering motor 18, and the steering ECU 14 detects the actual steering angle δ based on the motor rotation angle.

Then, a target steering torque T*, which is a steering torque T required to steer the wheel 10, is determined based on the steering angle deviation Δδ according to the following equation, that is, according to the PID control law. Incidentally, $G_P$, $G_I$, and $G_D$ in the following expression are a proportional term gain, an integral term gain, and a derivative term gain, respectively.

$$T^* = G_P\Delta\delta + G_I\int\Delta\delta dt + G_D\frac{d\Delta\delta}{dt} \tag{9}$$

The steering torque T can be considered to be approximately proportional to a steering current I, which is a current supplied to the steering motor 18. Accordingly, the steering ECU 14 determines a target steering current I*, which is a target of the steering current I, by multiplying the determined target steering torque T* by a steering current determination coefficient $K_I$, and supplies a current to the steering motor 18 based on the target steering current I*.

(b) Rear Wheel Avoidance Control

In a case where either one of the left and right front wheels 10F passes unevenness that disturbs traveling of the vehicle, the traveling of the vehicle becomes considerably unstable when the rear wheel 10R located on the same left or right side also passes the unevenness. Therefore, in the present system, the rear wheel avoidance control is executed so as not to allow the rear wheel 10R to pass the unevenness that the front wheel 10F has passed. The processing in the rear wheel avoidance control will be described below.

i) Changing Target Side Slip Angle

Figure 3A:
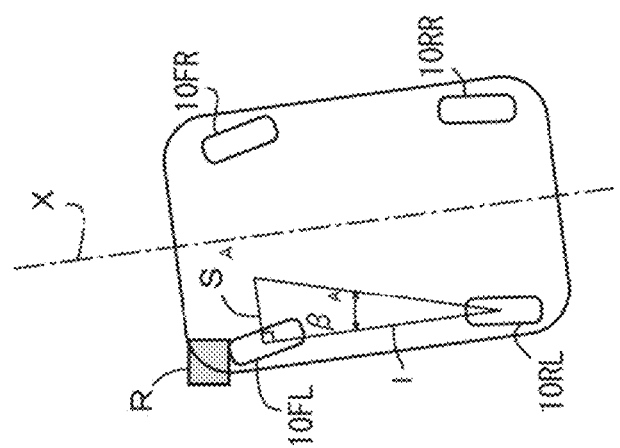
FIG. 3A is a conceptual diagram for explaining avoidance of unevenness of a rear wheel by a rear wheel avoidance control.

In the rear wheel avoidance control, the central ECU 16 changes the target side slip angle β* in the target line travel control from 0° during straight running or the standard side slip angle $\beta_{REF}$ during turning to the rear-wheel avoidance side slip angle $\beta_A$. Referring to FIG. 3A, the rear-wheel avoidance side slip angle $\beta_A$ is determined according to the following equation. FIG. 3A shows a situation in which the left front wheel 10FL passes unevenness R while the vehicle is turning left, and SA is a distance for the rear wheel 10R to avoid the unevenness R, that is, a rear wheel shift distance. Incidentally, although the rear wheel 10R may be shifted to either the left or the right, in the present system, the rear wheel 10R is shifted toward the center of the vehicle with respect to the front wheel 10F.

$$\beta_A = \tan^{-1}\left(\frac{S_A}{l}\right) \tag{10}$$

The rear wheel avoidance control, that is, the change of the target side slip angle β* to the rear-wheel avoidance side slip angle $β_A$, is executed until the rear wheel 10R passes the unevenness. Specifically, the control is executed from the time when the front wheel 10F passes the unevenness R until the vehicle travels a distance corresponding to the wheelbase 1. The central ECU 16 acquires a travel distance D of the vehicle based on odometry information. Specifically, the central ECU 16 acquires the travel distance D of the vehicle based on, for example, a wheel speed $v_W$ of each wheel 10. When the vehicle has traveled the distance corresponding to the wheelbase 1, the central ECU 16 returns the target side slip angle β* from the rear-wheel avoidance side slip angle $β_A$ to 0° if the vehicle is traveling straight or to the standard side slip angle $β_{REF}$ if the vehicle is turning.

Figure 3B:
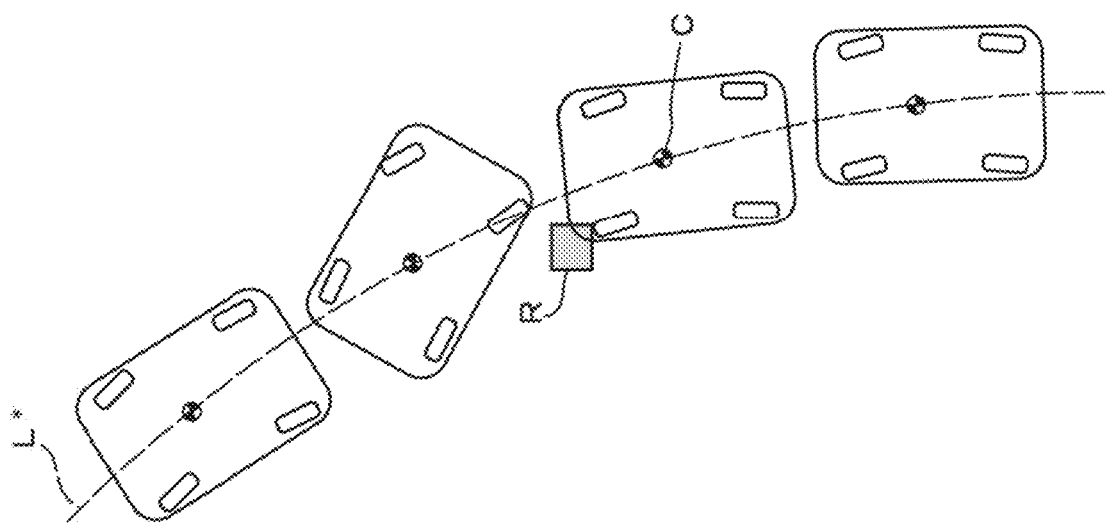
FIG. 3B is a conceptual diagram illustrating a behavior of a vehicle when the rear wheel avoidance control is executed while a target line travel control is executed.

By the rear wheel avoidance control described above, as schematically shown in FIG. 3B, it is possible to avoid the rear wheel 10R from passing the unevenness R while the vehicle travels along the target line L*, in other words, while the vehicle travels such that the center-of-gravity point C moves on the target line L*.

ii) Initiation Conditions

The rear wheel avoidance control is started when any one of the front wheels 10F passes the unevenness R as a trigger. The unevenness R that triggers the rear wheel avoidance control is unevenness of such a degree that the traveling of the vehicle is estimated to be considerably unstable if even the rear wheel 10R passes the unevenness R. The load of the vehicle body is shared by the four wheels 10. However, when one front wheel 10F passes certain unevenness, not only the one front wheel 10F but also one rear wheel 10R located on the same left or right side may not share the weight of the vehicle body, depending on the degree of the unevenness. Simply speaking, both the front wheel 10F and the rear wheel 10R on one of the left and right sides are in a lifted state (hereinafter, also referred to as a "one-side two-wheel lifted state"). In the present system, the execution of the rear wheel avoidance control is started on condition that the vehicle is in the one-side two-wheel lifted state.

Figure 4:
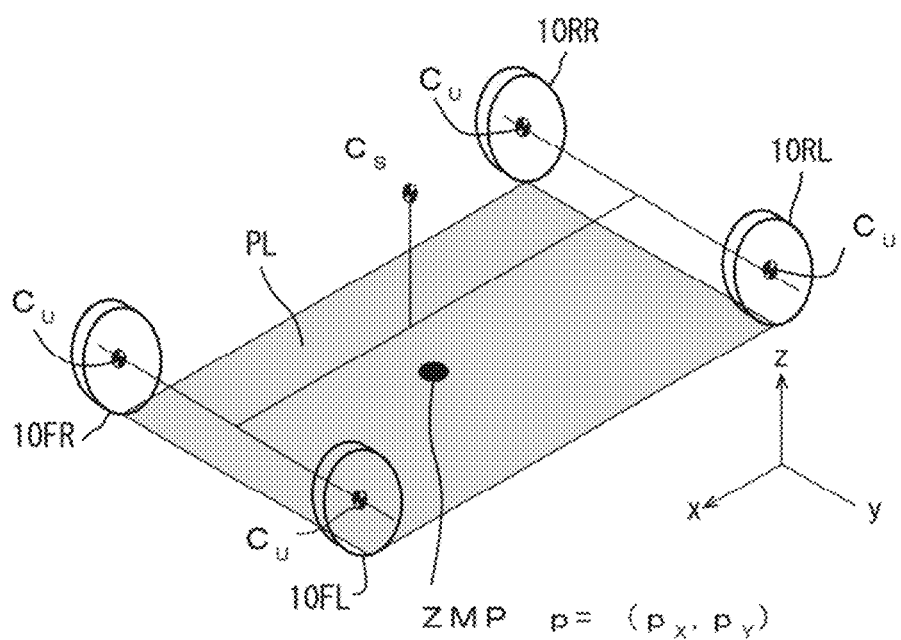
FIG. 4 is a conceptual diagram for explaining a method of detecting a lift of wheels by ZMP.

The detection of the one-side two-wheel lifted state is performed according to a method based on ZMP (zero moment point). Since this method is a general method, the method will be briefly described below with reference to FIG. 4. The "ZMP" means a point at which a resultant force of gravity and an inertial force with respect to the vehicle intersects the road surface.

In the (x, y, z) coordinate system, a center-of-gravity position vector «C», a vehicle momentum vector «P», a vehicle angular momentum vector «L», a gravitational acceleration vector «g», and a ZMP position vector «p» are defined as follows:

«C»=$[xyz]^T$

«P»=$[P_X P_Y P_Z]^T$

«L»=$[L_X L_Y L_Z]^T$

«g»=$[0 0 -g]^T$

«p»=$[p_X p_Y p_Z]^T$

In this instance, regarding the position of the ZMP, the following two equations hold. Incidentally, M is the vehicle weight, and g is the gravitational acceleration.

$$p_X = \frac{Mgx + p_Z \dot{P}_X - \dot{L}_Y}{Mg + \dot{P}_Z} \quad (11)$$

$$p_Y = \frac{Mgy + p_Z \dot{P}_Y + \dot{L}_X}{Mg + \dot{P}_Z} \quad (12)$$

In the drawing, a sprung center of gravity Cs and each unsprung center of gravity Cu corresponding to each wheel 10 are shown, and a plane defined by connecting points at which the four wheels 10 respectively contact a road surface is defined as a support plane PL. By the road surface input from the wheel 10, the position ($p_X$, $p_Y$) of a projection point p of the ZMP on the support plane PL moves on the support plane PL. When one of the two front wheels 10F passes the unevenness R, if the height or the depth of the unevenness R is relatively large, the ZMP moves greatly, and the projection point p moves to the position of one of the left and right edges of the support plane PL. At this time, one of the left and right wheels of the vehicle is in the one-side two-wheel lifted state. In the present system, when the projection point p of the ZMP has moved to the position of one of the left and right edges of the support plane PL, the rear wheel avoidance control is started assuming that the front wheel 10F has passed the unevenness R to be dealt with.

(c) Flow of Target Steering Angle Determining Process

Figure 5:
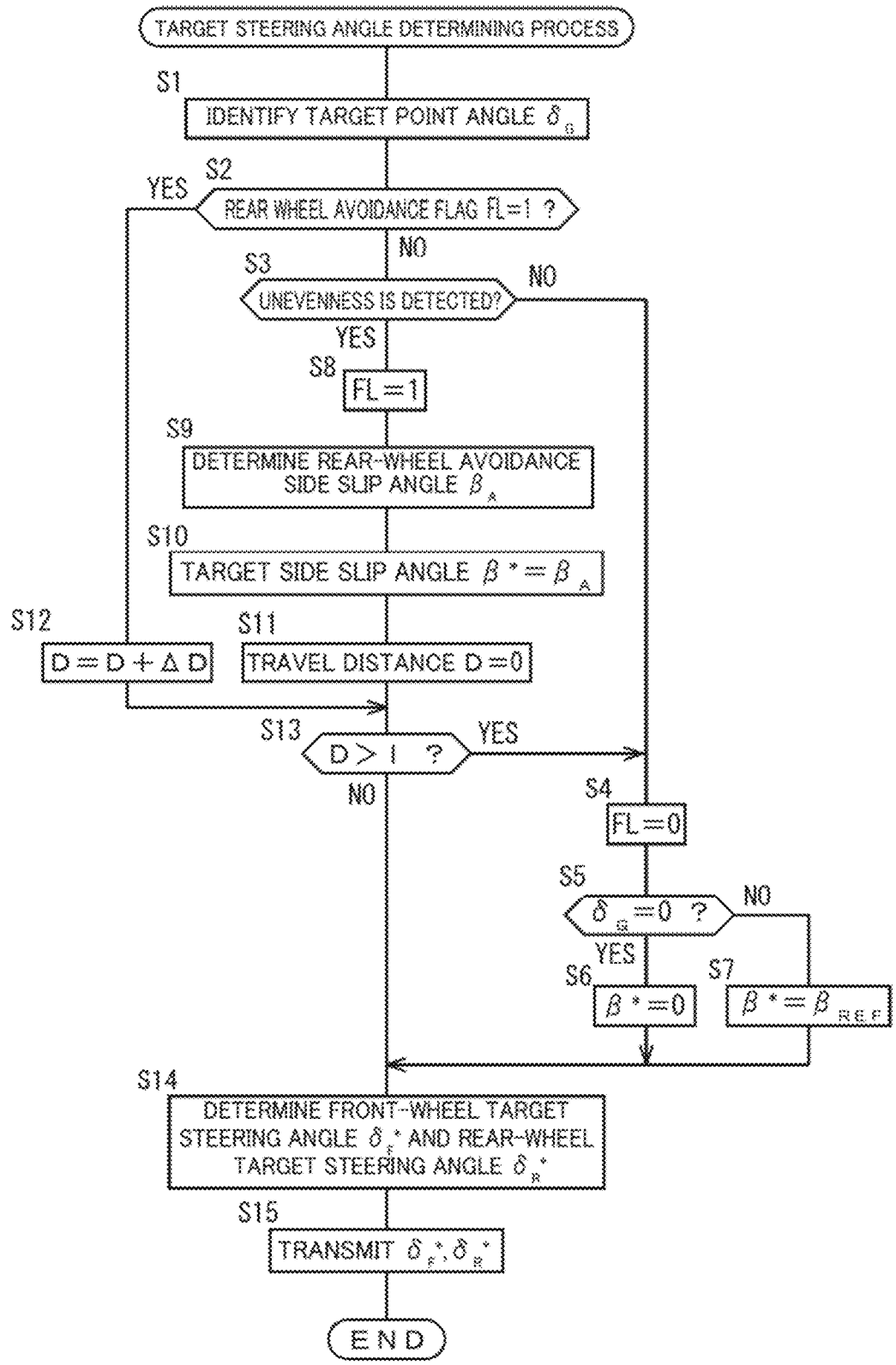
FIG. 5 is a flowchart of a target steering angle determining process program executed in the steering system of the embodiment.

The target steering angle determining process in the target line travel control including the rear wheel avoidance control described above is performed by the central ECU 16 repeatedly executing the target steering angle determining process program shown in the flowchart of FIG. 5 at a short time pitch (for example, several to several tens of msec). The flow of the target steering angle determining process will be described below with reference to the flowchart.

The data on the target line L* of the vehicle is constantly transmitted from the automatic traveling ECU 22. In the process according to the program, first, step 1 (hereinafter abbreviated as "S1" and the same applies to the other steps) is executed. In S1, the target point angle $δ_G$ is identified based on the data. Next, in S2, it is determined whether or not a rear wheel avoidance flag FL is 1. The rear wheel avoidance flag FL is a flag that is set to 1 when the rear wheel avoidance control described above is being executed and is set to 0 when the rear wheel avoidance control is not being executed.

When the rear wheel avoidance control is not being executed, it is detected in S3 whether or not any of the left and right front wheels 10F has passed the unevenness R to be dealt with, based on the ZMP method described above. When none of the front wheels 10F has passed the unevenness R, the rear wheel avoidance flag FL is reset to 0 in S4. Subsequently, in S5, it is determined whether the vehicle travels straight or turns. Specifically, when the target point angle $δ_G$ is 0, it is determined that the vehicle travels straight, and when the target point angle $δ_G$ is not 0, it is determined that the vehicle turns. In the case of straight traveling, the target side slip angle β* is set to 0 in S6. In the case of turning, the target side slip angle β* is set to the standard side slip angle $β_{REF}$ in S7.

When it is determined in S3 that any of the front wheels 10F has passed the unevenness R, the rear wheel avoidance flag FL is set to 1 in S8, and the rear wheel avoidance control is started. Then, in S9, the rear-wheel avoidance side slip angle $β_A$ is determined as described above. In S10, the target side slip angle β* is set to the rear-wheel avoidance side slip angle $\beta_A$. Subsequently, in S11, the travel distance D is reset to 0. The travel distance D is a distance traveled by the vehicle after the front wheel 10F has passed the unevenness R.

When it is determined in S2 that the rear wheel avoidance flag FL is 1, that is, when the rear wheel avoidance control is being executed, the travel distance D is updated by an update distance ΔD in S12. The update distance ΔD is determined based on the execution time pitch of the program, the wheel rotation speed $v_W$ of each wheel 10, and the like. When the rear wheel avoidance control is being executed, it is determined in S13 whether the travel distance D exceeds the distance corresponding to the wheelbase 1 of the vehicle. When the travel distance D exceeds the distance corresponding to the wheelbase 1, the rear wheel avoidance flag FL is reset to 0 in S4, and the execution of the rear wheel avoidance control is terminated.

In S14, the front wheel target steering angle $\delta_F^*$ and the rear wheel target steering angle $\delta_R^*$ are determined according to the above-described method based on the target sideslip angle $\beta^*$, the target point angle $\delta_G$, the target distance $S_G$, and the like set as described above. In S15, signals of the determined front wheel target steering angle $\delta_F^*$ and rear wheel target steering angle $\delta_R^*$ are transmitted to the steering ECUs 14 via the CAN 20. Each of the steering ECUs 14 that has received the signal regarding the target steering angle $\delta^*$ steers the corresponding wheel as described above so that the steering angle $\delta$ of the wheel 10 becomes equal to the target steering angle $\delta^*$.

What is claimed is:

1. A steering system for a vehicle, comprising:
   a front wheel steering device configured to steer a front wheel, a rear wheel steering device configured to steer a rear wheel, and a controller configured to control the front wheel steering device and the rear wheel steering device such that the front wheel and the rear wheel are steerable independently of each other,
   wherein, when the front wheel passes unevenness, the controller executes a rear wheel avoidance control to avoid the rear wheel from passing the unevenness, and
   wherein, in the rear wheel avoidance control, the controller determines a rear-wheel avoidance side slip angle, which is a vehicle center-of-gravity point side slip angle to be realized, and determines a target steering angle, which is a steering angle to which each of the front wheel and the rear wheel is to be steered, based on the rear-wheel avoidance side slip angle.

2. The steering system according to claim 1, wherein, in the rear wheel avoidance control, the controller determines the rear-wheel avoidance side slip angle based on a wheelbase of the vehicle and a distance by which the rear wheel is to be shifted from the unevenness in a lateral direction.

3. The steering system according to claim 1,
   wherein the controller executes a target line travel control in which the front wheel and the rear wheel are steered such that the vehicle travels along a target line that is a travel line along which the vehicle is to travel, and
   wherein, when the front wheel passes the unevenness, the controller executes the rear wheel avoidance control while continuing to execute the target line travel control.

4. The steering system according to claim 3,
   wherein, in the target line travel control, the controller sets a target point on the target line ahead of the vehicle and determines the target steering angle of each of the front wheel and the rear wheel based on (a) a positional relationship between the target point and the vehicle and (b) a standard side slip angle that is a predetermined vehicle center-of-gravity point side slip angle, and
   wherein the controller executes the rear wheel avoidance control while executing the target line travel control, by determining the target steering angle of each of the front wheel and the rear wheel based on the rear-wheel avoidance side slip angle instead of the standard side slip angle.

5. The steering system according to claim 1, wherein the controller executes the rear wheel avoidance control on condition that the controller detects a lift of both the front wheel and the rear wheel.

6. The steering system according to claim 1, wherein the controller executes the rear wheel avoidance control until the vehicle travels a distance corresponding to a wheelbase of the vehicle after the front wheel passes the unevenness.

* * * * *